United States Patent

Habberley

[11] Patent Number: 6,082,528
[45] Date of Patent: Jul. 4, 2000

[54] CONVEYOR ROLLER

[76] Inventor: Alan Habberley, 38 Brookhouse Lane, Featherstone, Wolverhampton WV10 7AW, United Kingdom

[21] Appl. No.: 09/021,313

[22] Filed: Feb. 10, 1998

[30] Foreign Application Priority Data

Feb. 13, 1997 [GB] United Kingdom .................... 9702997
Apr. 8, 1997 [GB] United Kingdom .................... 9707126

[51] Int. Cl.$^7$ .................................................. B65G 13/00
[52] U.S. Cl. ............................................................. 198/842
[58] Field of Search .............................. 193/37; 198/835, 198/842; 384/480

[56] References Cited

U.S. PATENT DOCUMENTS

| 1,362,910 | 12/1920 | Zoeller et al. . | |
| 2,035,927 | 3/1936 | Smith | 308/20 X |
| 3,255,858 | 6/1966 | Reilly | 193/37 |
| 4,325,473 | 4/1982 | Garnett | 193/35 R X |
| 4,606,659 | 8/1986 | Hogan | 384/518 X |
| 4,643,300 | 2/1987 | Morrison . | |
| 5,022,132 | 6/1991 | Valster et al. . | |
| 5,025,917 | 6/1991 | Smith et al. . | |
| 5,046,869 | 9/1991 | Roberts et al. . | |
| 5,048,661 | 9/1991 | Toye | 193/35 R X |
| 5,074,408 | 12/1991 | Smith et al. . | |
| 5,156,443 | 10/1992 | Ide | 301/1 X |
| 5,261,528 | 11/1993 | Bouchal . | |
| 5,381,887 | 1/1995 | Emmons | 198/830 X |
| 5,421,442 | 6/1995 | Agnoff | 193/37 |
| 5,433,308 | 7/1995 | Gagnon | 193/37 |

FOREIGN PATENT DOCUMENTS 0 112 026   6/1984   European Pat. Off. .

Primary Examiner—Jospeh E. Valenza
Assistant Examiner—K W Bower
Attorney, Agent, or Firm—Nixon & Vanderhye PC

[57] ABSTRACT

A conveyor roller for supporting conveyor belts is of simple construction and incorporates five main elements. There is an outer cylindrical member on which the conveyor belt rides in use and an axial hollow shaft extending axially of the roller. At each end of the assembly is a housing member attached to the cylindrical member and a central fixed member between which the axial shaft extends and which is attached thereto. A bearing is located between the housing member and the fixed member in each case and these parts are also sealed in relation to one another. The fixed member is an integral unit having a stub shaft at one axial end for connection to the axial shaft and, at the other end, means for supporting the roller on fixed supports. The fixed member also extends outwardly to adjacent the cylindrical member. The roller is simple to construct and assemble using simple components.

8 Claims, 2 Drawing Sheets

CONVEYOR ROLLER

BACKGROUND OF THE INVENTION

1. Field of the Invention

This invention relates to conveyor rollers for supporting conveyor belts, such rollers sometimes being termed idler rollers.

2. Description of the Related Art

Conveyor rollers are conventionally used for supporting the conveying and return runs of belt conveyors, individual rollers being supported at their ends on a support structure and a portion of the roller engaged by the belt being rotatable. Various forms of rollers have been proposed for this purpose having different characteristics in relation to durability, manufacturing costs and safety. For example EP 0112026, U.S. Pat. No. 5,261,528, U.S. Pat. No. 5,022,132, U.S. Pat. No. 4,643,300, U.S. Pat. No. 5,074,408, U.S. Pat. No. 5,025,917 and U.S. Pat. No. 5,046,869 each propose conveyor rollers intended to give these features.

SUMMARY OF THE INVENTION

An object of the present invention is to provide an improved conveyor roller.

Accordingly the invention provides a conveyor roller for supporting a conveyor belt which comprises a hollow rotatable cylindrical member, housing members at opposite ends of the cylindrical member and secured for rotation therewith, central fixed members at opposite ends of the cylindrical member each associated with a housing member, bearing means between each housing member and the associated fixed member, a hollow axial shaft secured at opposite ends to and extending between the central fixed members, and sealing means between each of the central fixed members and the associated housing members to prevent the ingress of material between said members from the exterior of said roller, the fixed members each including means for supporting the roller on fixed supports whereby the fixed members are held stationary during rotation of the roller, the central fixed members each being in the form of an integral unit and each including an integral stub shaft for securing the fixed member to one end of said hollow axial shaft by location of the stub shaft into an end of the hollow axial shaft, said unit further including said means for supporting the roller on said support, and a radially outwardly directed portion extending towards and having its outer part adjacent the hollow cylindrical member on which the conveyor belt is to be supported.

Preferably in the conveyor roller said integral unit comprising each central fixed member, is formed as a plastics moulding of unitary construction.

Conveniently each integral stub shaft is a friction fit into the hollow axial shaft.

The hollow rotatable member defines an outer receiving surface for the conveyor belt and is conveniently a friction fit around an outer surface of each housing member.

The fixed central members are sealed in relation to the rotatable housing members at the outer periphery of each central member by the provision of sealing surfaces arranged to urge any foreign materials away from the joint between said members.

In addition a labyrinth seal may be provided between the cooperating surfaces of the housing member and the associated central member.

BRIEF DESCRIPTION OF THE DRAWINGS

By this arrangement a roller is provided which has a minimum number of parts, which can be readily assembled and which is durable in construction.

Further features of the invention will appear from the following description of an embodiment of the invention given by way of example only, and in which.

DETAILED DESCRIPTION OF THE INVENTION

Figure 1:
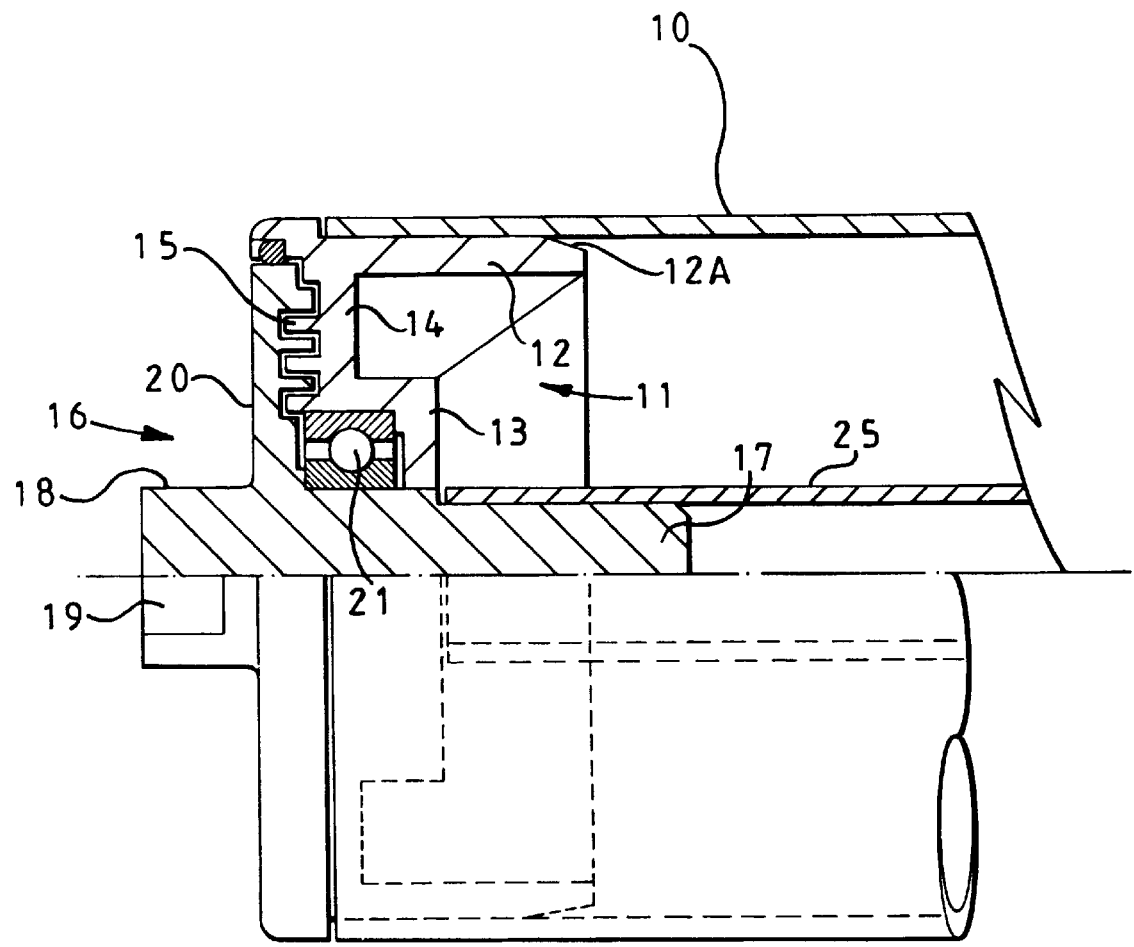
FIG. 1 is a partial longitudinal section through one end of a roller assembly.

Referring to the drawings, a conveyor roller assembly or idler roller has an outer hollow cylindrical shell 10, the outer surface of which is arranged to be engaged by a conveyor belt.

At each end the shell 10 receives a rotatable housing 11 having a cylindrical extension 12 about which is fitted by friction fit the end of the shell 10.

The housing 11 is formed as a one piece plastics moulding which includes a central bearing housing portion 13 integral with the extension 12 through a radially directed portion 14. The portion 14 has annular ridges 15 spaced radially from each other over one side of the portion 14.

The housing 11 is assembled with a central fixed member 16 or end plate, also formed as a one piece plastics moulding. The member 16 is formed with an integral stub shaft 17 and an integral oppositely directed support member 18 of generally cylindrical shape but having oppositely located flats 19 whereby the support member 18 may be fixedly located in a roller support (not shown). The member 16 also includes a radially directed portion 20 which has an inner face defining annular grooves which cooperate with the ridges 15 on the outer face of the housing 11 whereby to form a labyrinth seal between the housing 11 and the member 16. The portion 20 extends radially outwards so that at its outer periphery it is adjacent but spaced radially inwards from the cylindrical shell 10.

A bearing 21 is located around the member 16 and between the member 16 and the bearing housing portion 13 of the housing 11. The bearing 21 permits the housing 11 to be rotatable about the fixed member 16 during operation.

Figure 2:
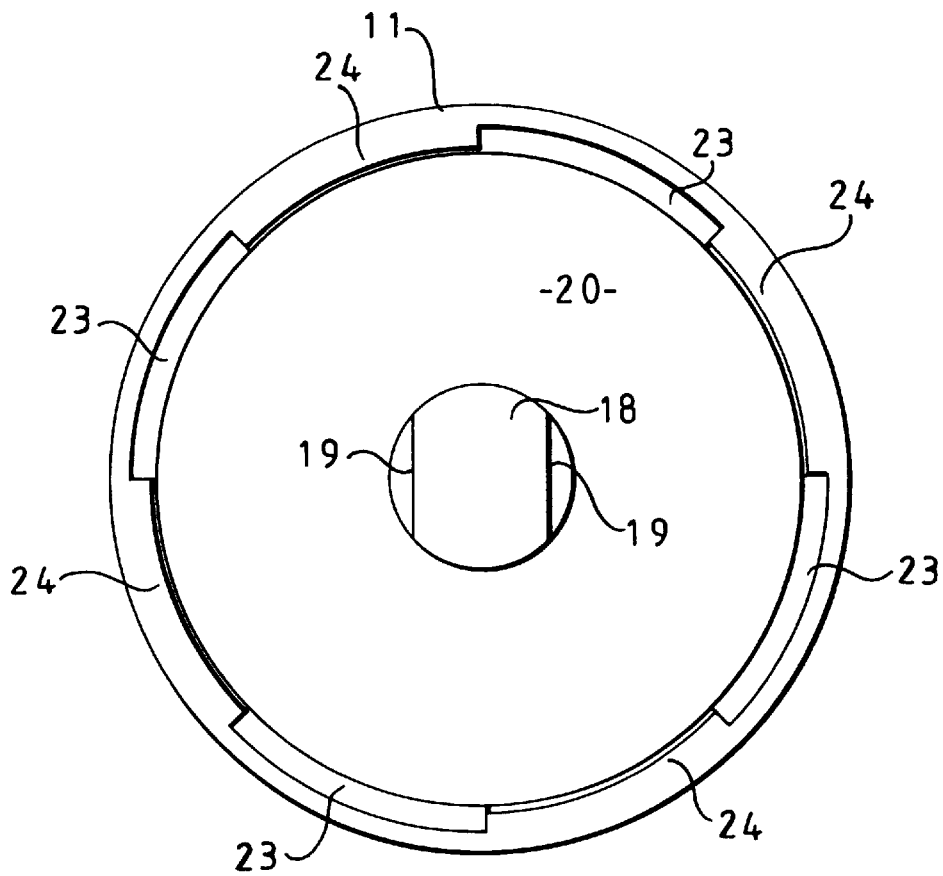
FIG. 2 is an end view of the assembly of FIG. 1.
Figure 3:
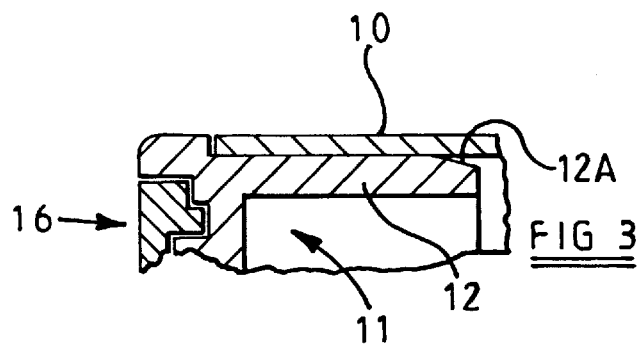
FIG. 3 is a scrap section on the line A—A in FIG. 2.
Figure 4:
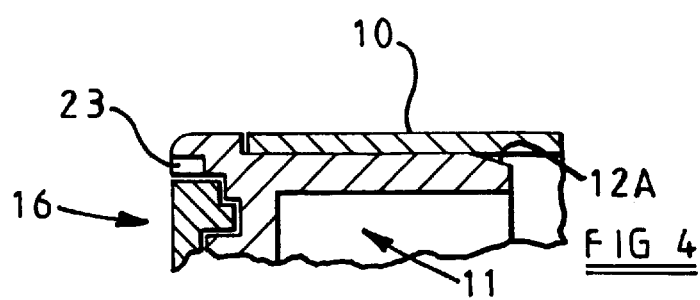
FIG. 4 is a scrap section on the line B—B in FIG. 2.

At the outer periphery of the portion 20 of the member 16 there is provided an arrangement for preventing the ingress of material between the member 16 and the housing 11. In the illustrated arrangement the portion of the housing 11 adjacent the outer periphery of the portion 20 of the member 16 is arranged to present inwardly and outwardly directed surfaces 23 and 24 (see in particular FIGS. 2, 3 and 4). Thus in whichever direction the roller is rotating the inwardly and outwardly directed surfaces urge material at the outer periphery of the portion 20 to be directed away from the adjacent surfaces of the member 16 and housing 11. In practice the inwardly and outwardly directed surfaces are arranged continuously about the roller. The labyrinth seal between the radially inner parts of the housing 11 and the member 16 also serve to prevent the ingress of material between the fixed and rotatable members.

The shell 10 is a friction fit on the housing 11 and assembly is assisted by providing a chamfer 12A at the outer end of the extension 12.

A central hollow shaft 25 extends from one end to the other of the roller and fits as a friction fit over the stub shaft 17 formed on the fixed member 16. Thus the fixed members 16 at opposite ends of the roller are interconnected by the shaft 25 and the rotatable housings 11 are interconnected by the shell 10.

The stub shaft 17 may be of square section and again be a force fit in the shaft 25 which is of corresponding section. This arrangement also assists in the correct alignment of the flats 19 relative to each other.

A further embodiment allows for holes to be made near the ends of shaft 25, into which projections, formed or affixed to the ends of stub shaft 17, can engage to assist in the location and friction fit of shaft 17 to shaft 25.

It will be appreciated that the assembly described consists of relatively few parts which are easily assembled to form the roller assembly. The component parts are made by moulding in the case of the housings 11 and the fixed members 16. The shell 10 and the shaft 25 may be extrusions of plastic or metal.

I claim:

1. A conveyor roller for supporting a conveyor belt, comprising:

a hollow cylindrical member for supporting the conveyor belt;

housing members respectively secured by a friction fit to respective, opposite ends of the cylindrical member;

central fixed members at respective, opposite ends of the cylindrical member, a said central fixed member being associated with each said housing member;

bearing means disposed between each housing member and the associated central fixed member so that the hollow cylindrical member and housing members secured thereto are rotatable relative to said central fixed members;

a hollow axial shaft secured at opposite ends thereof to and extending between the central fixed members; and a seal defined between each said central fixed member and the respective housing member to substantially prevent the ingress of material therebetween, the central fixed members each being in the form of an integral unit and each including a first integral stub shaft for securing the central fixed member to a respective end of said hollow axial shaft by locating the first sub shaft into an end of the hollow axial shaft and engaging the same with a friction fit, a second integral stub shaft for supporting the central fixed member on a respective adjacent fixed support whereby the fixed members are held stationary during rotation of the hollow cylindrical member and housing members secured thereto, and an integral disk-like radially extending portion extending towards and having an outer part adjacent the respective end of the hollow cylindrical member on which the conveyor belt is supported, said seal being defined at least in part by said disk-like portion.

2. A conveyor roller according to claim 1 wherein said integral unit comprising each central fixed member is formed as a plastics moulding of unitary construction.

3. A conveyor roller according to claim 1 wherein the cylindrical member defines an outer receiving surface for the conveyor belt and is secured at opposite ends by a friction fit to outer cylindrical surfaces of the housing members.

4. A conveyor roller according to claim 1 wherein the radially outwardly directed portion of each central fixed member is arranged with its inner face closely adjacent the outer face of the associated housing member.

5. A conveyor roller according to claim 1 wherein the fixed central members are sealed in relation to the rotatable housing members at the outer periphery of each central member by the provision of sealing surfaces arranged to urge any materials away from the join between said members.

6. A conveyor roller according to claim 1 comprising a labyrinth seal extending in the radial direction of the roller and provided between the cooperating surfaces of the housing member and the associated central member.

7. A conveyor roller according to claim 1 wherein the housing member is formed as a plastics moulding.

8. A conveyor roller according to claim 1 wherein the fixed member support means includes an integral stub shaft extending outwardly of the axis of the roller.

* * * * *